United States Patent [19]

Karlsson et al.

[11] 4,204,501
[45] May 27, 1980

[54] ANTI-LICK RING FOR AUTOMATIC DRINKING TROUGHS FOR ANIMALS

[76] Inventors: Rune Karlsson; Berit Karlsson, both of Blacksta Pl 5133, Nyköping, Sweden, S-611 00

[21] Appl. No.: 925,977

[22] Filed: Jul. 19, 1978

[30] Foreign Application Priority Data

Jul. 29, 1977 [SE] Sweden ................................ 7708717

[51] Int. Cl.² .............................................. A01K 7/00
[52] U.S. Cl. ..................................................... 119/72
[58] Field of Search ............................ 119/72, 74, 76

[56] References Cited

U.S. PATENT DOCUMENTS

| 1,231,073 | 6/1917 | Schwertfeger et al. | 119/75 |
| 1,599,352 | 9/1926 | Ahlman | 119/72 |

FOREIGN PATENT DOCUMENTS

| 61530 | 10/1939 | Norway | 119/72 |
| 62348 | 4/1940 | Norway | 119/72 |
| 8182 | 12/1896 | Sweden | 119/72 |

Primary Examiner—Louis G. Mancene
Assistant Examiner—Robert P. Swiatek
Attorney, Agent, or Firm—Meyer, Tilberry & Body

[57] ABSTRACT

An anti-lick ring for an animal drinking trough which is held inside the trough by spaced connecting devices.

8 Claims, 2 Drawing Figures

U.S. Patent May 27, 1980 4,204,501
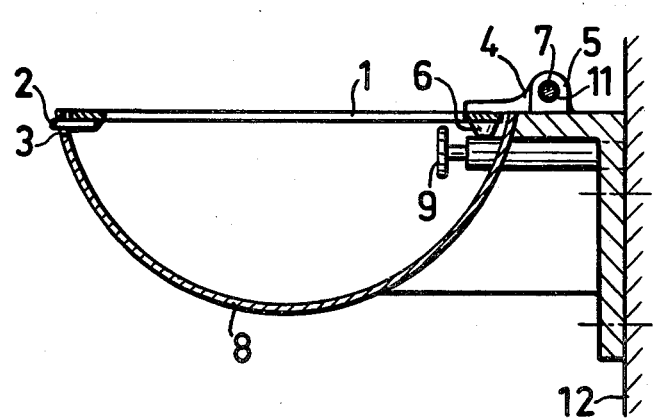
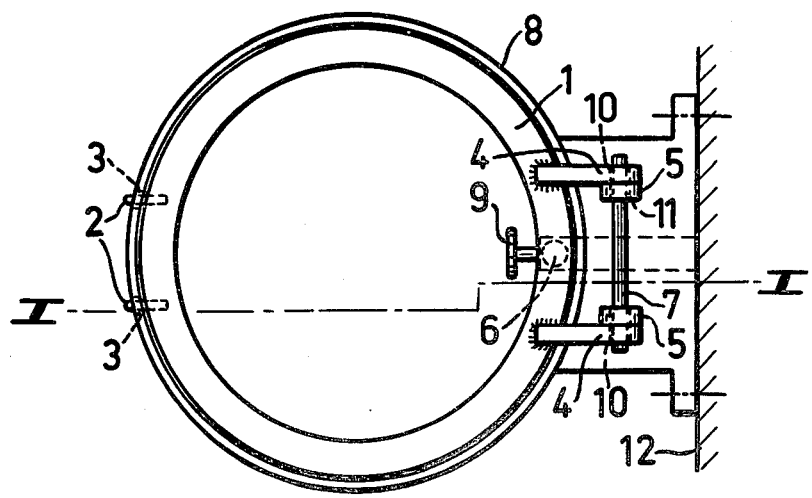

ANTI-LICK RING FOR AUTOMATIC DRINKING TROUGHS FOR ANIMALS

The time of normal masticatory and digestive work of animals has been shortened substantially due to the fact, that livestock, particularly stabled cattle, are fed with concentrated fodder instead of with large amounts of coarse fodder which previously had constituted the normal animal fodder. This has given rise to problems of different kinds for the animals, resulting in stress, aggressiveness and restlessness.

Unfortunately, the animals frequently vent their aggressiveness or restlessness upon the automatic drinking trough present in the stable.

The animals press water into the trough and then lick the water out of the trough in such a manner that the entire stable floor is flooded with water. This "game" of the animals results in unsanitary consequences for the animals and requires counter-measures. Particularly young stock are exposed to diseases and infections due to the permanent wetness of the floor.

Conventional constructions of splash guards for drinking troughs have proved seriously deficient both from a functional and hygienic aspect and, therefore, are not used in practice.

An insert ring in the drinking trough must meet severe hygienic requirements to be approved for use. This implies that the ring also must be easily detachable for its own cleaning and that of the trough. Projecting parts, furthermore, are not allowed either to the side or above the trough.

An anti-lick ring having the aforesaid features has been rendered possible by the present invention which has been given the characteristic features defined in the attached claims.

The lick ring can easily be removed from the trough and be cleaned.

The invention is described in the following specification by way of an example, with reference to the drawing, in which:

FIG. 1 is a lateral view of the drinking trough as a section I—I in FIG. 2, and

FIG. 2 is a view from above of the drinking trough.

In the drawing, the drinking trough proper is designated by 8, and the automatic water valve operated by the animal is designated by 9. On the same level as the upper edge of the trough 8 an anti-lick ring 1 can be mounted. The inner edge of the ring 1 is straight, with perpendicular transitions to the upper surface and, respectively, lower surface of the ring. The trough 8 is provided on the side remote from the attachment side, i.e. the front side, with two holes 3, into which outwardly directed pins 2 located on the lower surface of the ring 1 are fitted. On the portion of the ring 1 being opposed to the pins two upwardly directed ears 4 are fastened, which are provided with holes 10 located coaxially relative to each other. The trough 8 further is provided with two upwardly directed ears 5 having coaxially located holes 11. On the lower surface of the ring 1 a rubber cushion 6 is provided at the same height as the water valve 9.

12 designates the support, for example a wall or the like, to which the trough 8 is attached.

The ring is mounted by inserting its pins 2 into the holes 3 and lowering the rear portion of the ring with the respective ear 4 on the outside of each ear 5. The rubber cushion 6 then rests against the fixed portion of the water valve 9. By applying a slight pressure on the rear portion of the ring against the action of the rubber cushion 6, the holes 10 of the ears 4 will coaxially coincide with the holes 11 of the ears 5. A split pin 7 is inserted through all holes, after which the ring 1 is released. The rubber cushion now presses the ring upwardly and thereby locks the split pin 7 by friction, so that the split pin cannot be detached by the animals nor unintentionally slide out of the holes. The function of the rubber cushion also renders it possible to permit a large allowance, i.e. a large tolerance, between the holes and the split pin.

It is apparent from the above, that the anti-lick ring according to the invention easily can be detached and kept clean, like the trough in general.

The invention, of course, can be modified within its scope. The rubber cushion, for example, can be replaced by one or more resilient members and can be permitted to act against one or more special protuberances of the trough, instead of against the water valve.

What we claim is:

1. An anti-lick ring for an animal drinking trough comprised of a ring having upper and lower surfaces and an outside diameter slightly smaller than the inside diameter of said drinking trough; attachment pins attached to said ring so as to mate with associated apertures in said trough; said pins being on different diameters of said ring and easily releasable attachment means diametrically opposite said pins preventing longitudinal movement of said pins.

2. The device of claim 1 wherein said releasable attachment means is comprised of upstanding ears having apertures therein attached to said ring, coacting upstanding ears having apertures therein attached to said drinking trough and a rod passing through each aperture to secure said ring to said trough.

3. The device of claim 2 wherein said drinking trough has an engagement surface near said releasable attachment means and said ring is provided with resilient means engaging said engagement surface, thereby applying pressure to said rod trough said ears and locking said ring in place.

4. The device of claim 3 wherein said attachment pins are attached to the lower surface of said ring.

5. The device of claim 4 wherein said rod passing through said ears is a split pin.

6. An animal drinking trough comprised of a hemispherical trough attached at one side to a vertical support, having a water feed means; upstanding ears having apertures therein; apertures near the top of said hemispherical trough on the side opposite said upstanding ears; an engagement surface near said upstanding ears and an anti-lick ring of an annular shape having an outside diameter slightly smaller than the inside diameter of said trough, engagement pins engaging said apertures in said trough, upstanding ears having apertures therein coacting with said upstanding ears on said trough to attach said anti-lick ring to said trough.

7. The device of claim 6 wherein a split pin passes through the apertures of said upstanding ears to attach said ring to said trough.

8. The device of claim 7 wherein said ring is provided with resilient means engaging said engagement surface, thereby applying pressure to said split pin through said ears and locking said ring in place.

* * * * *